United States Patent [19]
Hegler et al.

[11] Patent Number: 5,141,427
[45] Date of Patent: Aug. 25, 1992

[54] APPARATUS FOR THE PRODUCTION OF PLASTIC PIPES

[75] Inventors: Ralph-Peter Hegler, Bad Kissingen; Wilhelm Hegler, Goethestrasse 2, D-8730 Bad Kissingen, both of Fed. Rep. of Germany

[73] Assignee: Wilhelm Hegler, Bad Kissingen, Fed. Rep. of Germany

[21] Appl. No.: 727,023

[22] Filed: Jul. 8, 1991

[30] Foreign Application Priority Data

Jul. 6, 1990 [DE] Fed. Rep. of Germany ........ 4021564

[51] Int. Cl.⁵ .................. B29C 49/38; B29C 51/36
[52] U.S. Cl. .................. 425/233; 425/326.1; 425/336; 425/388; 425/396; 425/DIG. 60
[58] Field of Search .............. 425/233, 303, 324.1, 425/325, 326.1, 336, 342.1, 369, 388, 392, 396, 405.1, DIG. 60

[56] References Cited

U.S. PATENT DOCUMENTS

| 4,199,314 | 4/1980 | Lupke et al. | 425/396 |
| 4,381,276 | 4/1983 | Hegler et al. | 425/396 |
| 4,492,551 | 1/1985 | Hegler et al. | 425/326.1 |
| 4,718,844 | 1/1988 | Dickhut et al. | 425/336 |
| 5,059,109 | 10/1991 | Dickhut et la. | 425/233 |

FOREIGN PATENT DOCUMENTS

| 1255292 | 8/1962 | Fed. Rep. of Germany . |
| 1242848 | 12/1967 | Fed. Rep. of Germany . |
| 1704715 | 5/1977 | Fed. Rep. of Germany . |
| 3701822 | 8/1988 | Fed. Rep. of Germany . |

Primary Examiner—Jay H. Woo
Assistant Examiner—James P. Mackey
Attorney, Agent, or Firm—Browdy and Neimark

[57] ABSTRACT

Pipes with special profile sections are produced by an apparatus with circuit guided half shells. The half shells combining to form a mold have mold walls extending about parallel to a mold space axis. Vacuum slits extend about parallel to the mold space axis to open into a mold space in each case at a place radially the most distant from the mold space axis.

5 Claims, 7 Drawing Sheets

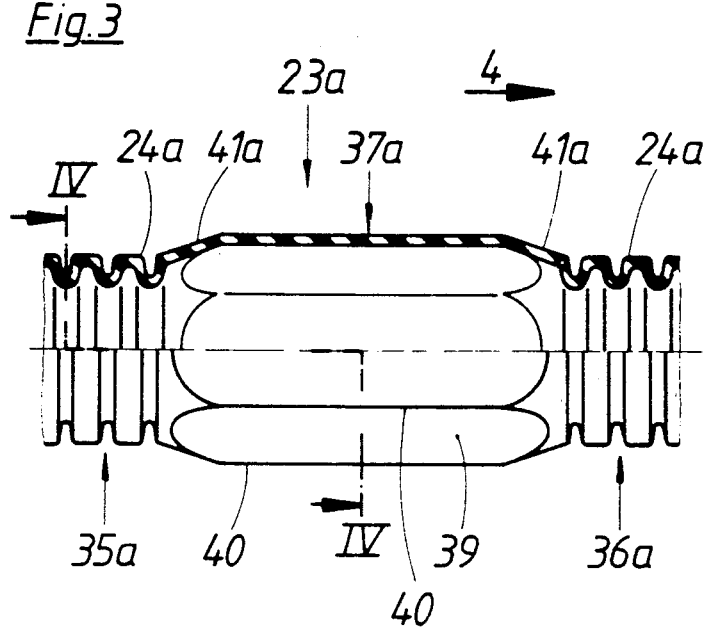
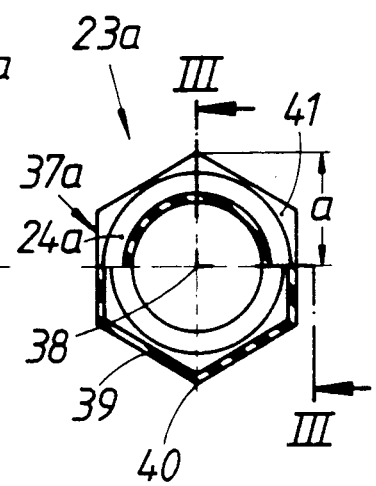
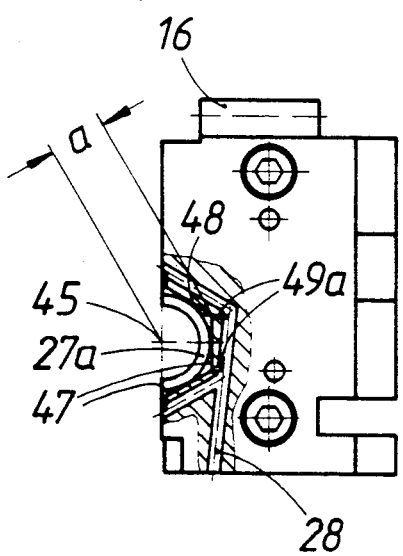
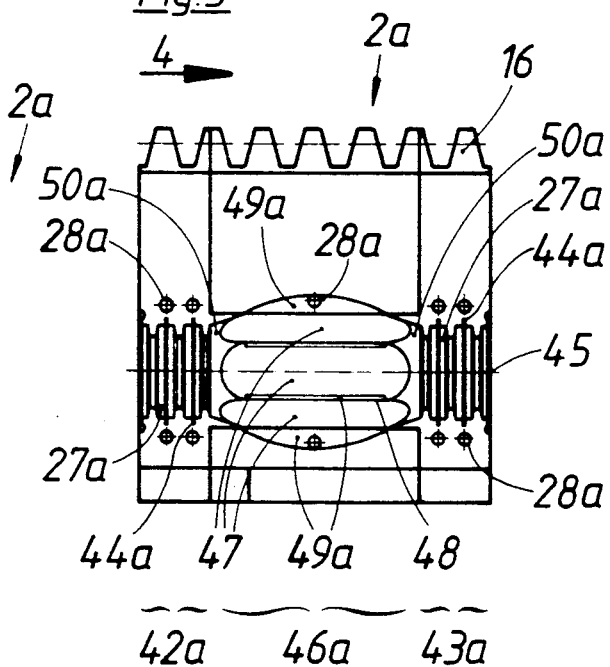

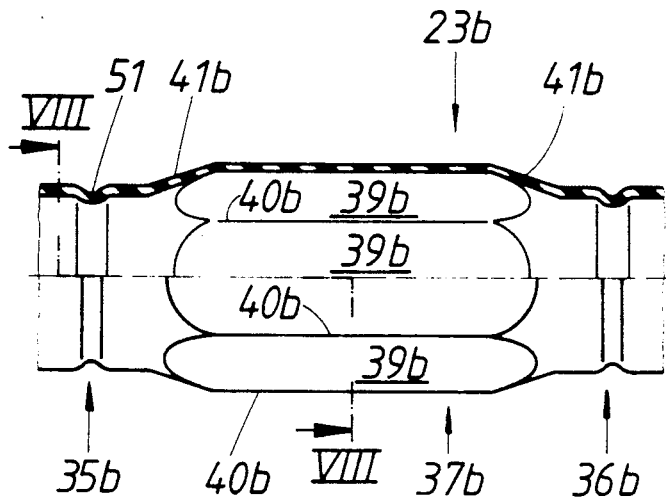
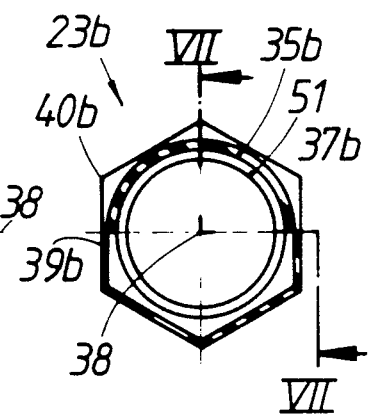
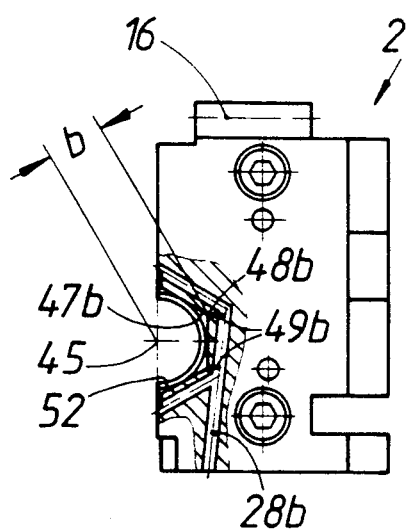
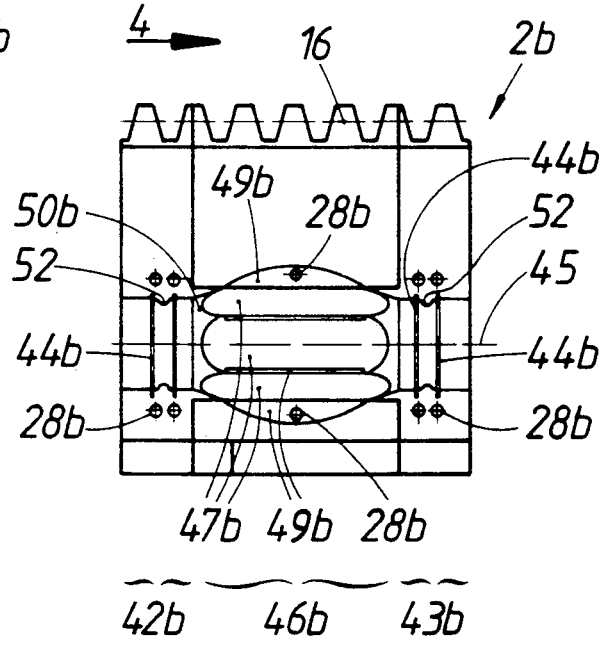

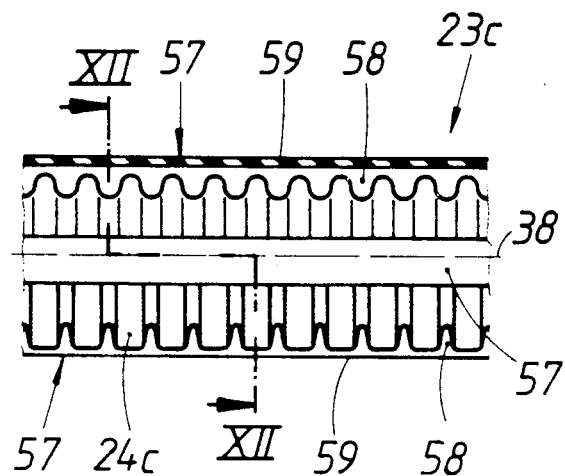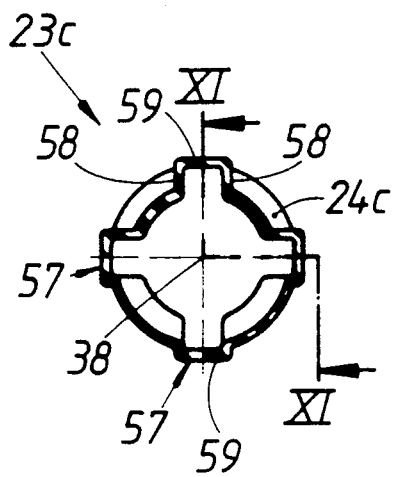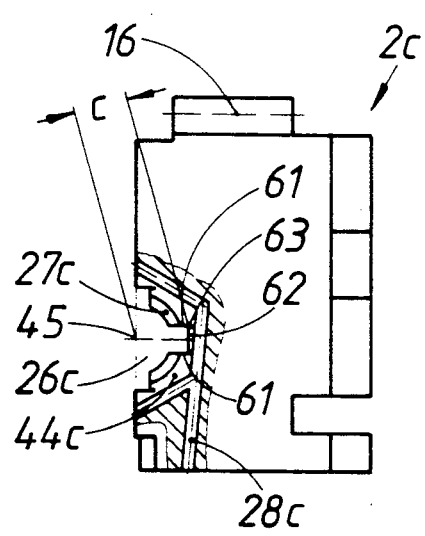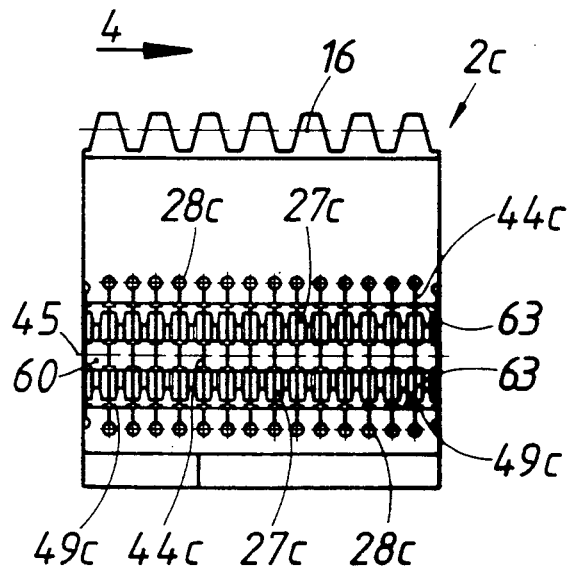

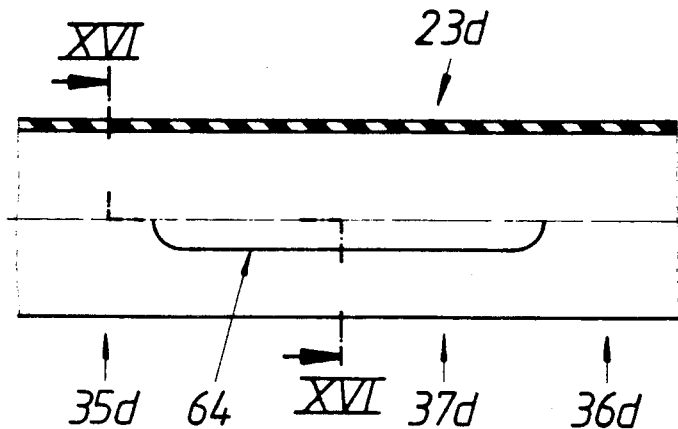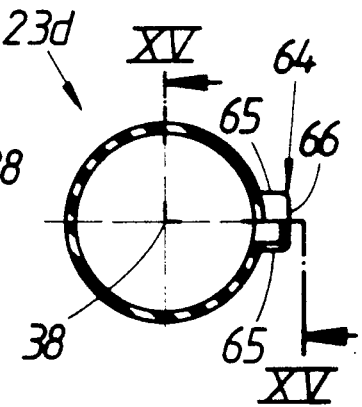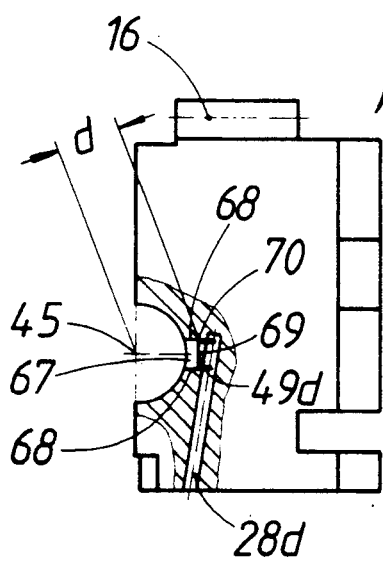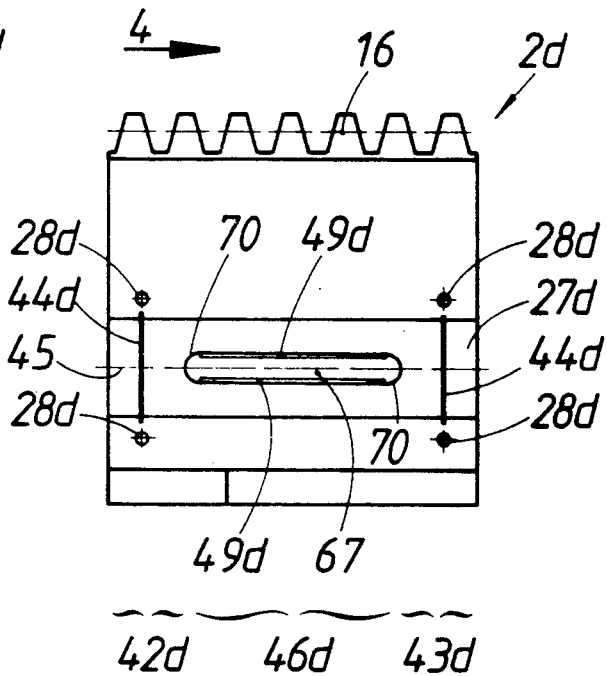

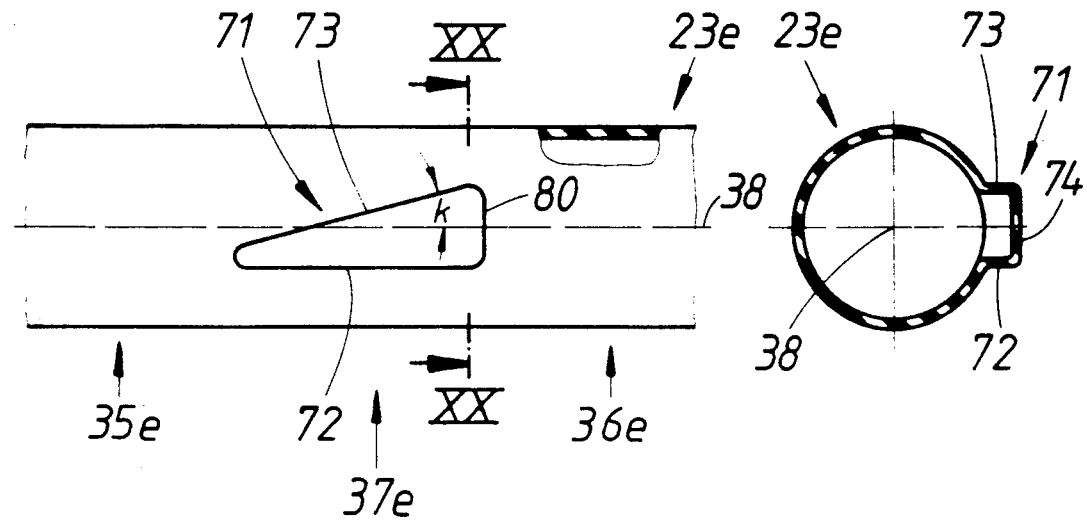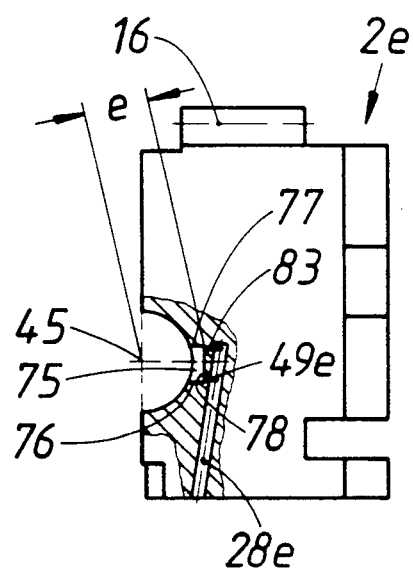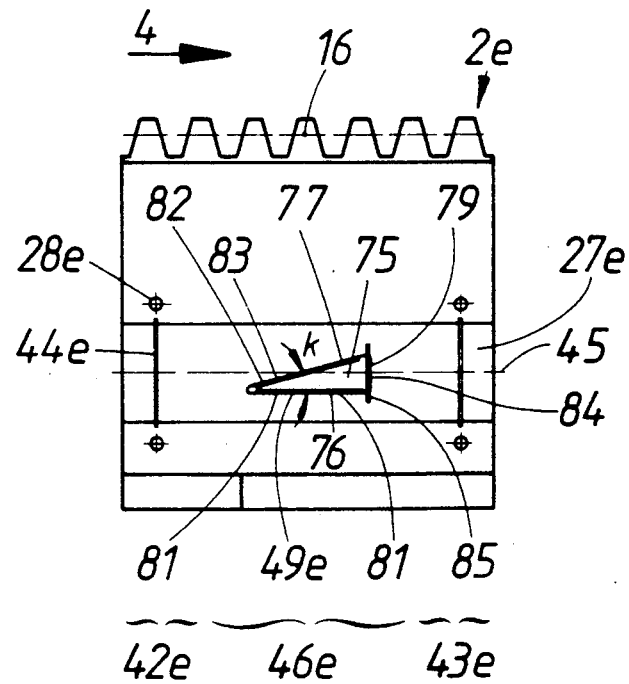

APPARATUS FOR THE PRODUCTION OF PLASTIC PIPES

FIELD OF THE INVENTION

The invention relates to an apparatus for the production of plastic pipes having half shells, which are provided with a mold recess and of which two in each case combine on a molding path to form a mold with a mold space axis, arranged on a machine bed to be be circuit guided, at least two half shells that combine to form at least one pair having a mold space section for the production of a special profile section of the pipe, a head of an extruder being arranged upstream of the molding path, the half shells being provided with vacuum channels connected with each mold recess by way of vacuum slits and vacuum connections being provided in the machine bed and opening into the molding path where they run into the vacuum channels.

BACKGROUND OF THE INVENTION

An apparatus of the generic kind is known from German patent 12 55 292. As described in U.S. Pat. No. 4,492,551, such apparatuses serve to produce pipes provided with transverse grooves, so-called corrugated tubes. Furthermore, corrugated tubes with helically extending transverse grooves can be produced, as described in German patent 12 42 848. Ribs may be provided instead of the transverse grooves, as can be taken from German patent 37 01 822. The molding of the transverse grooves or ribs is made in a vacuum forming process, i.e. by way of vacuum actuated vacuum slits at least substantially arranged at right angles to the mold space axis. As can be taken from German patent 17 04 715, pipes with flexible sections may also be produced on the apparatus according to German patent 12 55 292. The described pipes may further be formed as compound pipes with an additional inner pipe.

However, if pipes with special profile sections are to be produced, of which at least portions have a profile that can be calibrated, i.e. a profile that could also be produced in stationary extrusion tools, then a production of sufficiently good quality is not possible in a vacuum forming method with an apparatus of the generic kind.

SUMMARY OF THE INVENTION

It is an object of the invention to embody an apparatus of the generic kind such that also special profile sections with profiles at least partially to be calibrated can be produced in a vacuum forming method with high precision and quality.

This object is attained in accordance with the invention in that the at least one mold space section has surfaces oriented at least partially in the direction of the mold space axis and in that in at least one of these surfaces at least one vacuum slit extends at least substantially parallel to the mold space axis and opens into the mold space in a portion which—in relation to the mold space axis—is radially the most distant from the mold space axis. It is thus ensured that the special profile is formed completely and of good quality under vacuum. Vacuum is to be understood as an air pressure smaller than atmospheric pressure. The term surfaces does not necessarily mean plane surfaces, but may also mean curved surfaces. The vacuum slits need not necessarily be continuous in form; they can also be formed by short vacuum slits arranged one behind the other in one direction of by series of holes; their being oriented at least substantially parallel to the mold space axis is of decisive importance. The aim envisaged by the invention is of course also attained in that the at least one vacuum slit opens into the mold space in direct proximity of the area radially the most distant from the mold space axis. In case precisely defined joint edges having a relative maximum distance to the mold space axis exist between surfaces of a half shell, then the respective vacuum slit opens into this joint edge. The development according to which a plurality of vacuum slits not connected with each other open one behind the other into the mold space in the direction of the mold space axis serves to ameliorate the vaccuum effect with the consequence of a further amelioration of the forming.

The further development according to which at least one vacuum slit is provided extending at right angles to the mold space axis and according to which at least one vacuum slit extending approximately parallel to the mold space axis is connected with the vacuum slit extending at right angles to the mold space axis may be useful in the case of certain geometries of special profile sections.

In known manner the vacuum slits have a width smaller than or equal 0.5 mm to ensure that, when the pipe is formed, the thermally plastic material is not drawn into the vacuum slits. The measures according to the invention primarily ensure a complete attachment of the tube still in thermally plastic condition for the production of a pipe to the surfaces or to the wall, respectively, of a corresponding mold space section.

Further details of the invention will become apparent from the ensuing description of a number of examples of embodiment taken in conjunction with the drawing.

BRIEF DESCRIPTION OF THE DRAWINGS

FIG. 3 is a part section along the section line III in FIG. 4 of a first pipe with a special profile section, FIG. 4 is a cross-section through the first pipe according to the section line IV—IV in FIG. 3, FIG. 5 is a side view of a half shell for the production of the first pipe, FIG. 6 is a front view partially broken open of the half shell according to FIG. 5, FIG. 7 is a part section along the section line VII—VII in FIG. 8 of a second pipe with a special profile section, FIG. 8 is a cross-section through the second pipe according to the section line VIII—VIII in FIG. 7, FIG. 9 is a side view of a half shell for the production of a second pipe, FIG. 10 is a front view of the half shell according to FIG. 9 in a partially broken open representation, FIG. 11 is a partial longitudinal section of a third pipe along the section line XI—XI in FIG. 12, FIG. 12 is a cross-section of the third pipe along the section line XII—XII in FIG. 11, FIG. 13 is a side view of a half shell for the production of the third pipe, FIG. 14 is a front view of the half shell according to FIG. 13 in a partially broken open representation, FIG. 15 is a partial longitudinal section along the section line XV—XV in FIG. 16 of a fourth pipe with a special profile section, FIG. 16 is a cross-section through the fourth pipe according to the section line XVI—XVI in FIG. 15, FIG. 17 is a side view of a half shell for the production of the fourth pipe, FIG. 18 is a front view of the half shell according to FIG. 17 in a partially broken open representation, FIG. 19 is a partially broken open representation of a fifth pipe with a special profile section, FIG. 20 is a cross-section through the fifth pipe according to the section line XX—XX in FIG. 19, FIG. 21 is a side view of a half shell for the production of the fifth pipe, FIG. 22 is a front view of the half shell according to FIG. 21 in a partially broken open representation.

DESCRIPTION OF THE PREFERRED EMBODIMENTS

Figure 1:
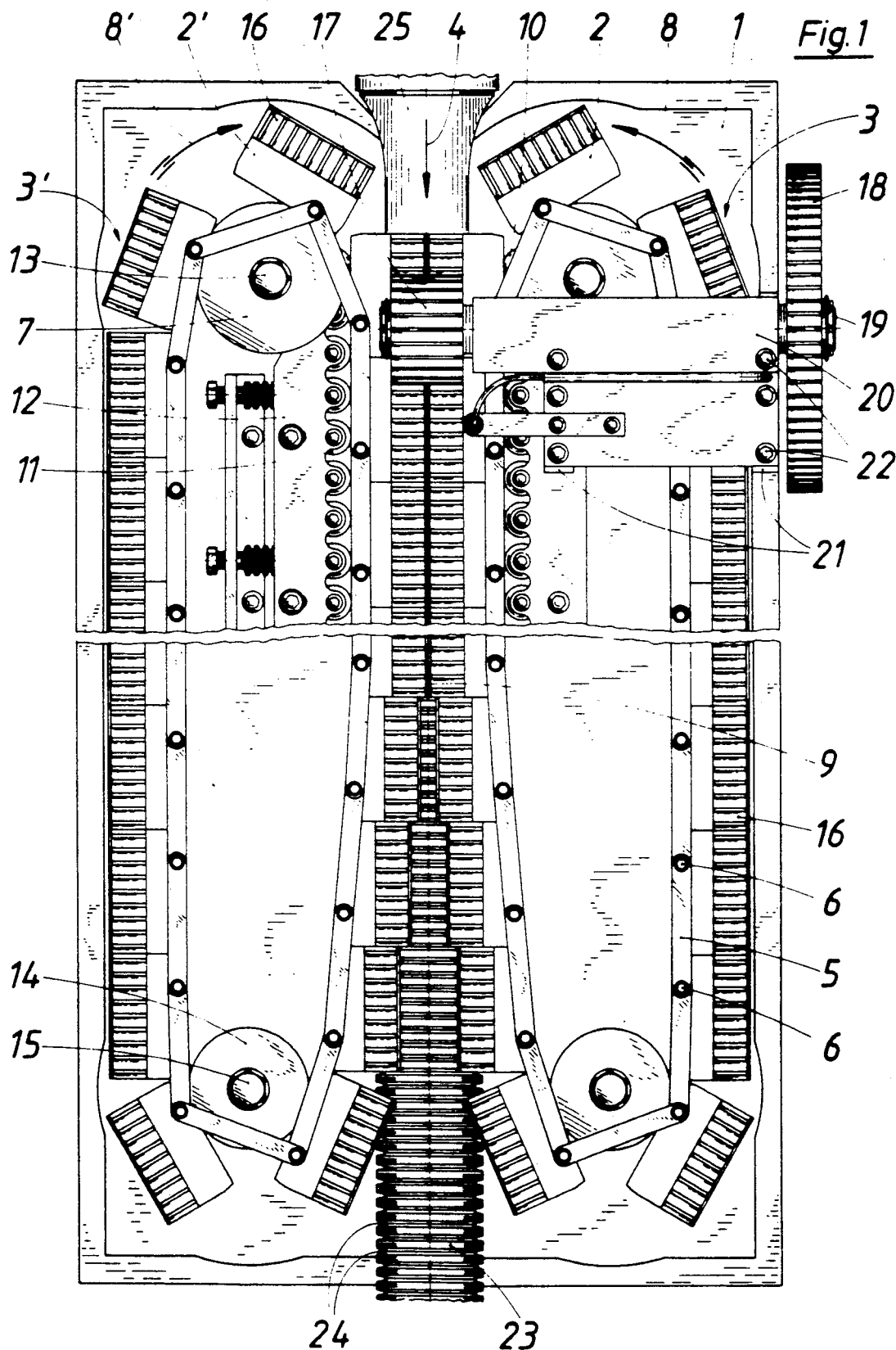
FIG. 1 is a top view of an apparatus according to the invention.

As seen in FIG. 1, the apparatus for the production of plastic tubes with transverse grooves comprises a machine bed 1, on which half shells 2, 2' are arranged, which are joined together respectively in so-called chains 3, 3'. For this purpose, a fish-plate 5 is coupled by means of a coupling bolt 6 to each half shell 2, 2' in the outer region thereof and downstream thereof with respect to the direction 4 of production, each fish-plate 5 being attached to the succeeding half shell 2, 2' at the corresponding position, likewise by means of another coupling bolt 6. The chains 3, 3' thus formed, at their rear end with respect to the direction 4 of production, are carried around guide wheels which serve as and may be designated feed rollers 7. The individual half shells 2, 2' are swung into a molding path 9 by the revolution of the chains 3, 3' in the direction of the arrows 8, 8'. In this path 9 two half shells 2, 2' at a time are united to a half shell pair, so that an unbroken succession of pairs of half shells mutually abut in the direction 4 of production. In order to achieve rapid closure of the half shells 2, 2' into a parallel and adjoining orientation, so-called closing rollers 10 are provided, which bring the rear ends of the half shells 2, 2', referred to the direction 4 of production, together in accelerated fashion.

In the molding path 9 itself, the mutually abutting half shells 2, 2' are pressed together by means of guide rollers 11, which are rotatably mounted in guide rails 12. The feed rollers 7 are rotatably mounted on the machine bed 1 about axle bearings 13. At the forward end of the machine bed 1, referred to the direction 4 of production, return rollers 14, likewise serving as guide wheels, are rotatably mounted on axle bearing 15, around which the chains 3, 3' are guided and returned to the feed rollers 7. As can be seen in FIG. 1, the guide rails 12 with the guide rollers 11 terminate after the length of several half shells 2, 2' and before the return rollers 14, so that the half shells 2, 2' can be displaced away from each other transversely of the direction 4 of the production while remaining parallel to each other, before they are guided around the return rollers 14.

On the upper side of the half shells 2, 2' there is provided a set of teeth 16, and the two sets of teeth 16 of the half shells 2, 2' which are arranged in abutting pairs match each other, so that a common pinion 17 can engage in the teeth 16, and push the half shells 2, 2' along the molding path 9 as a closed mold. This drive pinion 17 is driven in conventional manner by a motor (not shown) through a drive gear wheel 18 which is fixedly mounted on a shaft 19, the shaft in turn carrying the drive pinion 17. The shaft 19 is housed in a bearing 20, which is set apart from the machine bed 1 by means of spacing pieces 21 and firmly fixed in relation to the machine bed 1 by means of screws 22.

In the illustrated apparatus, plastic pipes 23 having among other things transverse profile features, i.e. with grooves 24 extending around their girth, are produced.

The pipes 23 will be described in more detail in the following. For this purpose an extruder is provided, of which only the injection head 25 is shown, from which a flexible tube (not seen) is extruded, and this tube enters the mold which has been formed in the molding path 9 while still in a thermally plastic condition, where among other things the transverse profile features are formed. The apparatus thus far described is known, for example, from EP-A-0 065 729. This apparatus can produce so-called compound pipes in the same manner, which pipes are outwardly similar to the pipe 23, but are formed with a continuous smooth pipe inside in a one-piece structure.

Figure 2:
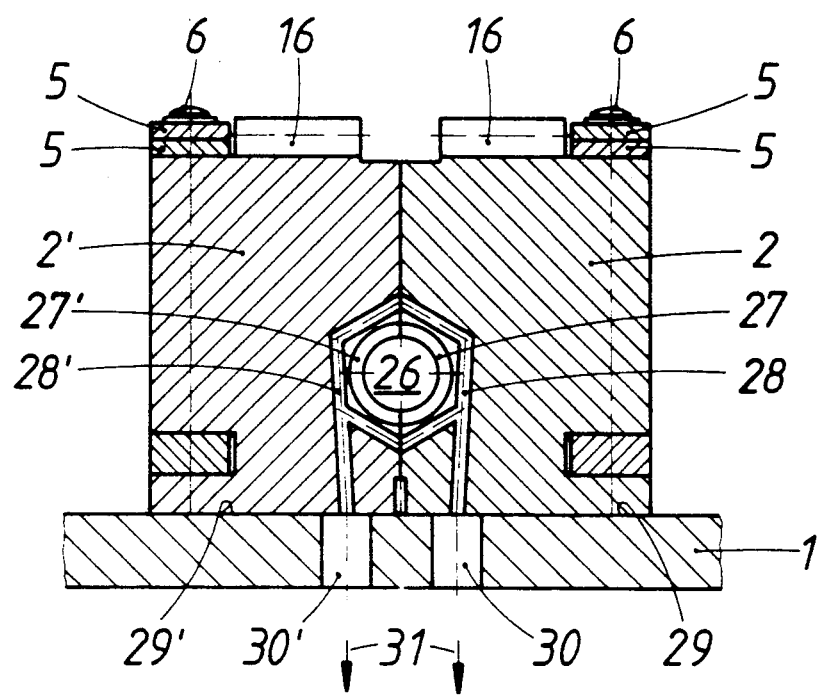
FIG. 2 is a vertical section through a pair of half shells of the apparatus.

In the molding path 9 the formation of the grooves 24 is among other things achieved by the applications of vacuum to the mold space 26 formed in the molding path 9. The mold recesses 27, 27' hollowed out in the half shells 2, 2' to produce a mold space 26 have a shape which is complementary to the outer shape of the pipe 23. They are provided with vacuum channels 28, 28' which run close to the wall of the mold recesses 27, 27' and embrace this wall at a relatively small spacing when the half shells 2, 2' lie together in pairs. From the vacuum channels 28, 28' numerous vacuum slits still to be described below open into the mold recess 27, 27'. The vacuum channels 28, 28' are connected together when the half shells 2, 2' lie against each other, as can be seen from FIG. 2. The vacuum channels 28, 28' open to the underside 29, 29' on the half shells 2, 2' which (underside) lies on the machine bed 1. When the half shells 2, 2' lie against each other in pairs, they communicate with vacuum connections 30, 30' provided in the machine bed 1, and these vacuum connections are in turn connected to a vacuum pump. The air current in the vacuum channels 28, 28' and the vacuum connections 30, 30' is shown by direction arrows 31.

In the following examples pipes will be shown and described that have special profile sections either over part of their length or over their full length. The half shells necessary for the production are equally shown. The pipe 23a shown in FIGS. 3 and 4 has pipe sections 35a and 36a produced in usual manner and as above described which are provided with transverse grooves 24a. Between the two sections 35a and 36a a special profile section 37a is provided having a multi-edged cross-section, in the present case a regular hexagonal cross-section. The section 37a thus has several—in the present case—external surfaces 39, which extend parallel to the pipe axis 38 and thus parallel to the direction of production 4 and which abut in each case at the profile edges 40 thus also extending parallel to the pipe axis 38. This distance a of these profile edges 40 and the pipe axis 38—referred to the two external surfaces 39 adjoining each profile edge 40—is the maximum distance from the pipe axis 38. In other words, the external surfaces 39 have a maximum distance a from the pipe axis 38 at each of their profile edges 40 and the area of an external surface 39 located between each of the the two profile edges 40 defining an external surface 39 has a radial distance from the pipe axis 38 which is smaller than a. A transition area 41a is provided between the portion of the special profile section 37a defined by the external surfaces 39, on the one hand, and each of the adjacent sections 38a and 36a, on the other hand.

A half shell 2a is shown in FIGS. 5 and 6 as it is used to form the pipe sections 35a, 36a and the special profile section 37a lying in between of a pipe 23a. It has mold space sections 42a and 43a with mold recesses 27a corresponding to the cross-section of the transverse grooves 24a. To ensure the formation of the transverse grooves 24a vacuum slits 44a are provided in usual manner which are connected with the vacuum channels 28a and which open each into the transverse grooves 24a where these are radially the most remote referred to pipe axis 38. This is in particular to be seen in FIG. 5.

The pipe axis 38 corresponds to the mold space axis 45. As seen in FIG. 5, the vacuum slits 44a extend at right angles to the direction of the mold space axis 45.

Between the two mold space sections 42a, 43a a mold space section 46a is provided serving to form the special profile section 37a. It has mold walls 47 serving to form the external surfaces 39. Vacuum slits 49a open into the mold space section 46a at the joint edges 48 or in direct proximity of two such adjacent mold walls 47 and are equally connected with at least one vacuum channel 28a. These vacuum slits 49a extend parallel to the profile edges 40 to be produced, i.e. parallel to the mold space axis 45. As shown the path of the vacuum slits 49a in FIG. 5, they are cut into the half shell 2a by a cylindrical cutter. The radial distance a of the vacuum slits 49 from the mold space axis 45 is therefore the greatest radial distance that a portion of the form wall 47 has from the mold space axis 45. A good, regular and clean forming of the special profile section 37a is therefore ensured. Separate vacuum slits are not always provided in the mold space section 50a provided for the formation of the transition areas 41a. In this example of embodiment the evacuation is made via the vacuum slits 49a, since—referred to the mold space axis 45—they are radially the most remote also in relation to the mold space sections 50a.

A pipe 23b is shown in FIGS. 7 and 8, of which portions are formed in a half shell 2b according to FIGS. 9 and 10. It has pipe sections 35b and 36b between which a special profile section 37b is formed which passes into each of the pipe sections 35b or 36b, respectively, by means of a transition area 41b.

The pipe sections 35b and 36b are basically designed to have smooth walls, i.e. they have a profile that can be calibrated, as it might for instance also be produced by extrusion. Right ahead of the transition area 41b each of them has a necking 51 about semicircular in cross-section. The neckings 51 extend at right angles, i.e. perpendicular to the pipe axis 38. The special profile section 37b is identical in shape with the special profile section 37a of the example of embodiment according to FIGS. 3 and 4. This is why the same reference numerals marked by an additional b are used for identical parts without any further description. The half shell 2b shown in FIGS. 9 and 10 and serving to form the sections of the pipe 23b shown in FIGS. 7 and 8 has mold space sections 42b and 43b that serve to form the pipe sections 35b and 36b. They only have a mold collar 52 correspondng to each necking 51 and serving to form the necking 51. On both sides of the mold collar 52, i.e. where is passes into the subsequent smooth mold wall, vacuum slits 44b are provided which are each connected with the vacuum channels 28b. They are therefore located in a portion which has the maximum distance from the mold space axis 45 referred to the adjacent portions.

The mold space section 46b serving to form the special profile section 37b is identical in structure with the mold space section 46a according to FIGS. 5 and 6. In FIGS. 8 and 9, therefore, identical parts have the same reference numerals completed by a b without any additional description. As regards to distance b between the mold space axis 45 and the joint edge 48b the same is true as for the distance a outlined above.

FIGS. 11 and 12 show the section of a pipe 23c uniformly structured over its full length, i.e. with a special profile section throughout. It has transverse grooves 24c extending only in sections in circumferential direction. Between the transverse grooves 24c continuous elevations 57 are formed, which extend in longitudinal direction of the pipe 23c and in parallel to the pipe axis 38 and which are about rectangular in cross-section according to FIG. 12, i.e. about cuboid in total. These elevations 57 each have two side surfaces 58 which extend about parallel to a radius of the pipe axis 38 and an external surface 59 which extends at right angles to this and at right angles to the pipe axis 38. These external surfaces 59 radially slightly project from the transverse grooves 24c, so that the external surfaces 59 of several pipes 23c can be placed one beside the other and can be piled up while the pipe axes 38 are arranged in parallel. In this case channels are formed between the adjacent elevations 57, i.e. in the area of the transverse grooves 24c. The use of such pipes 23c—as well as of those according to FIGS. 3, 4 and 7, 8—is possible for heat transfer agents.

A half shell 2c for the production of the pipe 23c according to FIGS. 11 and 12 has mold recesses 27c, which are appropriate for the production of the transverse grooves 24c and which are connected with vacuum channels 28c via vacuum slits 44c. These vacuum slits 44c extend in this case over the full semicylindrical circumference of the mold space 26c of the half shell 2c. They extend at right angles to the mold space axis 45. The half shell 2c is further provided with recesses 60 serving to form the elevations 57 and having side walls 61 for the formation of the side surfaces 58 and one external wall 62 each for the formation of the external surface 59. Individual vacuum slits 49c are provided at the joint edges 63 in each case between a side wall 61 and an external wall 62 and extend in parallel to the mold space axis 45. They are directly connected to the vacuum slits 44c and by way of the latter to a vacuum channel 28c each. The vacuum slits 49c continuously arranged one behind the other and associated with a joint edge 63 are thus not connected with one another. Here, too, the rule applies that the radial distance c of the mold space axis 45 from a vacuum slit 49c is the greatest possible radial distance related to the distance of each adjacent portion of the side walls 61 or the external wall 62 from the mold space axis 45, so that the vacuum necessary to form the side surfaces 58 and the external surface 59 of an elevation 57 is applied at the radially the most remote place—referred to the mold space axis 45.

The pipe 23d shown in FIGS. 15 and 16 has purely cylindrical pipe sections 35d and 36d, between which a special profile section 37d is arranged. It has a cylindrical portion identical with that of the pipe sections 35d and 36d. An elevation 64 projects from this radially outwards and is defined by side surfaces 65 and an external surface 66, and that similar to the elevation 57 of the example of embodiment according to FIGS. 11 and 12, with solely this elevation 64 extending only over a certain special profile section 37d parallel to the pipe axis 38.

The half shell 2d shown in FIGS. 17 and 18 for the production of the pipe according to the FIGS. 15 and 16 has a substantially cylindrical mold recess 27d, the mold space sections 42d and 43d enclosing a mold space section 46d. The mold space sections 42d and 43d are cylindrical in shape. Vacuum slits 44d open into them and are connected with vacuum channels 28d. The vacuum slits 44d extend at right angles to the mold space axis 45—as is general practice. A groove-like recess 67 extending parallel to the mold space axis 45 is provided in the mold space section 46d and is adapted in cross-section to the elevation 64. It has side walls 68 and an external wall 69 to form the side surfaces 65 and the external surface 66, respectively. A vacuum slit 49d opens into the recess 67 at each joint edge 70 between a side wall 68 and the external wall 69. These vacuum slits 49d are in turn connected with a vacuum channel 28e. Here, too, the rule applies that the radial distance d of the joint edges 70 extending parallel to the mold space axis 45 is the maximum radial distance of the external wall 69 or the side walls 68, respectively, from the mold space axis 45.

The pipe 23e according to FIGS. 19 and 20 differs from the pipe 23d according to FIGS. 15 and 16 only in that an elevation 71 is provided which is different from the elevation 64. Apart from this, therefore, all reference numerals of FIGS. 15, 16 are used with an e added without any renewed description. The elevation 71 has a side surface 72 extending parallel to the pipe axis 38 and a side surface 73 extending at an acute angle k relative to the pipe axis 38. The elevation 71 is closed by an external surface 74 towards the outside. The angle k is in any case smaller than 30°, preferably between 10°to 20°.

The half shell to be used for the production of the pipe 23e according to FIGS. 19, 20 is shown in FIGS. 21, 22. As far as possible the same reference numerals are used as in FIGS. 17, 18 each marked by a subsequent e. A recess 75 extending radially away from the mold recess 27e is provided for the production of the elevation 71 and has two side walls 76, 77 for the formation of the side surfaces 72, 73 and an external wall 78 for the formation of the external surface 74. The two side walls 76, 77 joining at an acute angle k are still connected with each other by a short transverse wall 79 extending at right angles to the mold space axis 45 and serving to form a corresponding transverse surface 80 which connects the side sufaces 72, 73. A vacuum slit 49e is provided at the joint edge 81 between the side wall 76 and the external wall 78 of the recess 75 and is connected to a vacuum channel 28e in usual manner. This vacuum slit 49e extends parallel to the mold space axis 45. A vacuum slit 83 is provided at the joint edge 82 between the side wall 77 and the external wall 78, it also encloses the angle k together with the vacuum slit 49e and it is also connected to the vacuum channel 28e, as seen in FIG. 22 in particular. Another vacuum slit 85 is formed at the joint edge 84 between the transverse wall 79 and the external wall 78, it extends at right angles to the mold space axis 45 and is equally connected to a vacuum channel 28e of its own. Here, too, the rule applies that the distance e of the joint edges 81, 82, 84 and thus the distance of the vacuum slits 49e, 83, 85 from the mold space axis 45 is the relatively greatest distance of the recess 75 from the mold space axis 45.

Figure 24:
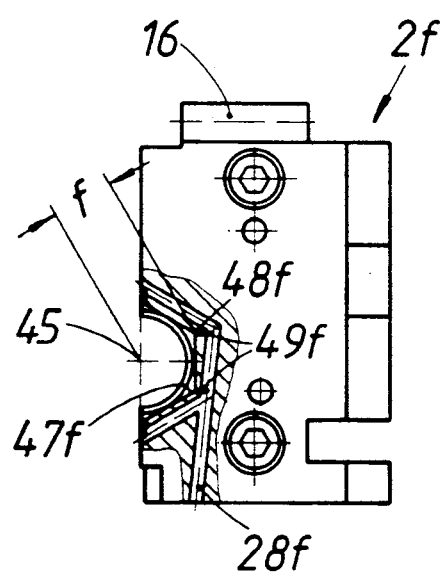
FIG. 24 is a front view of the half shell according to FIG. 23 in a partially broken open representation.
Figure 23:
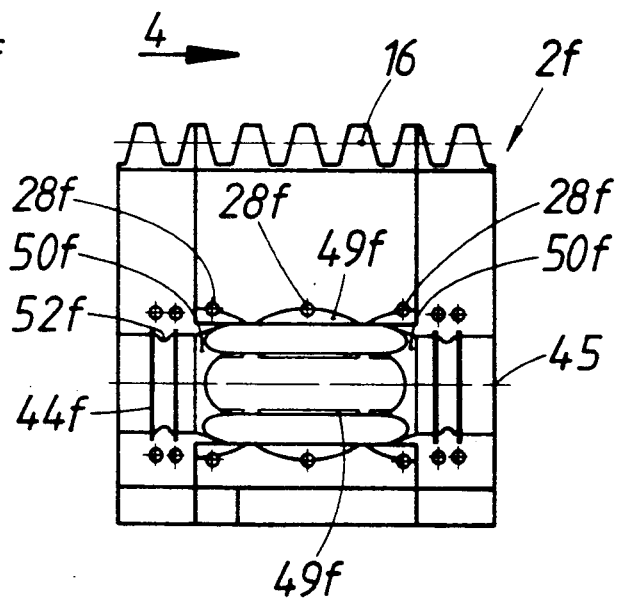
FIG. 23 is a side view of a modified embodiment of a half shell for the production of the second pipe.

The exemplary embodiment according to FIGS. 23 and 24 largely corresponds to that according to FIGS. 9 and 10. Therefore, the same reference numerals completed by an f are used without any further description. The pipe produced by means of the half shell 2f according to FIGS. 23 and 24 is identical with that according to FIGS. 7 and 8, so that again no renewed graphical representation is necessary. The only difference between the half shell 2f and the half shell 2b resides in that the vacuum slits 49f do not extend over the full length of the mold space section 46f, but only over a central partial section, as seen in FIG. 23. Towards the mold space section 50f this central vacuum slit 49f is followed by additional vacuum slits 86, 87 each connected to a vacuum channel 28f of their own and not in connection with the vacuum slit 49f. These vacuum slits 49f and 86, 87 also extend parallel to the mold space axis 45. This separation of the vacuum slits extending parallel to the mold space axis 45 and arranged one behind the other in the direction of production 4 results in an ameliorated formation.

What is claimed is:

1. An apparatus for the production of plastic pipes, comprising:

a machine bed (1);

a molding path (9);

a plurality of half shells (2,2'), of which each is provided with a mold recess (27), and of which two at a time combine as a pair on said molding path (9) to form a mold with a mold space (26) and a mold space axis (45);

means for circuit guiding two rows of said half shells (2,2');

at least one mold space section (46) for the production of a special profile section (37) of the pipe (23) formed by at least two of said half shells (2, 2') that combine to form said mold;

a head (25) of an extruder being arranged upstream of the molding path (9);

vacuum channels (28) provided in the half shells (2,2') and connected with each mold recess (27) by way of first vacuum slits (44); and vacuum connections (30) provide in the machine bed (1) and opening into the molding path (9) where said vacuum connections (30) run into said vacuum channels (28);

wherein the at least one mold space section (46) has surfaces oriented at least partially in the direction of the mold space axis (45) and wherein in at least one of said surfaces at least one additional vacuum slit (49) extends at least substantially parallel to the mold space axis (45) and opens into said mold space 26 in aportion which is radially the most distant from the mold space axis (45).

2. An apparatus according to claim 1, wherein said surfaces adjoin forming at least one joint edge (48) and wherein said additional vacuum slit (49) opens into said mold space 26 in the joint edge (48).

3. An apparatus according to claim 1, wherein a plurality of said at least one additional vacuum slit (49) not connected with each other open one behind the other into said mold space 26 in the direction of the mold space axis (45).

4. An apparatus according to claim 1, wherein at least one of said first vacuum slits (44) is provided extending at right angles to the mold space axis (45) and wherein at least one of said at least one additional vacuum slit (49) extending substantially parallel to the mold space axis (45) is connected with said at least one of said first vacuum slits (44) extending at right angles to the mold space axis (45).

5. An apparatus according to claim 1, wherein said at least one additional vacuum slit (49) has a width smaller than or equal to 0.5 mm.

* * * * *